May 11, 1965     W. B. ELAM     3,182,890
COMPARTMENT CONTAINER
Filed Dec. 12, 1962
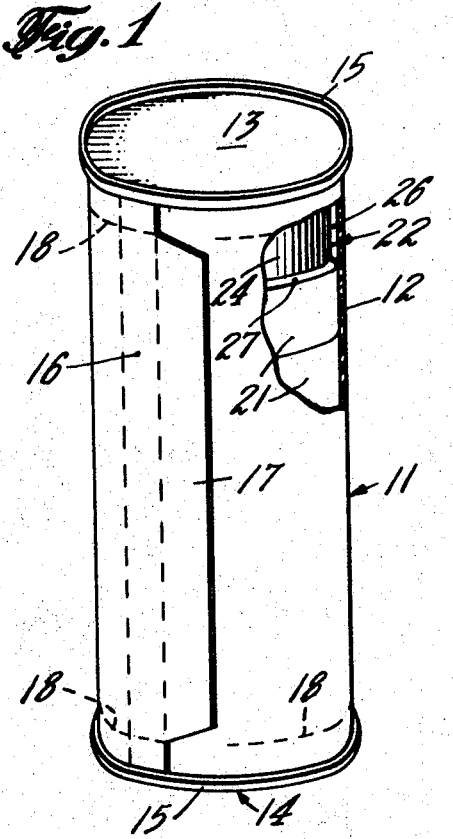
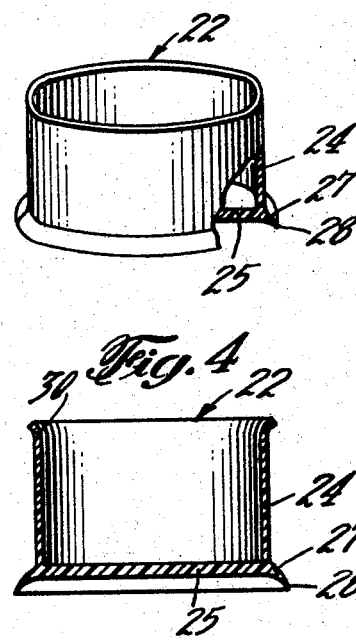
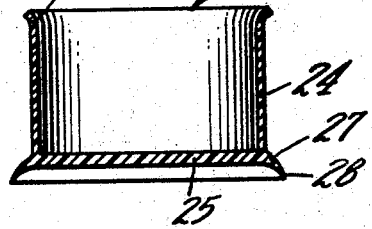
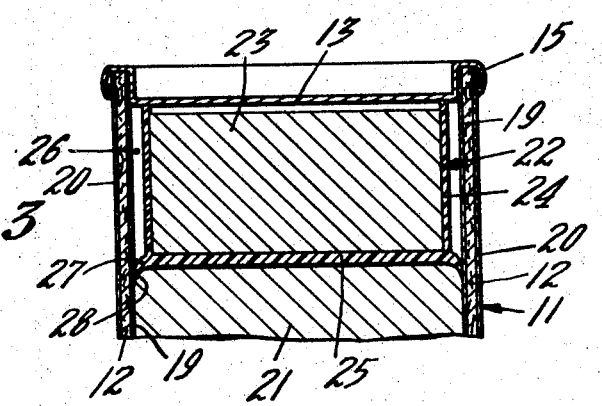
INVENTOR.
WILLIAM BINFORD ELAM
BY
Edward O. Then
AGENT United States Patent Office 3,182,890
Patented May 11, 1965

3,182,890
COMPARTMENT CONTAINER
William Binford Elam, Oakland, N.J., assignor to American Can Company, New York, N.Y., a corporation of New Jersey
Filed Dec. 12, 1962, Ser. No. 244,101
6 Claims. (Cl. 229—51)

This invention relates to compartment containers and more particularly to a container wherein a separate compartment is formed by a plastic cup which is inserted into the container body and is formed with an integral flexible gasket which seals against the container body wall.

Recently easy open composite containers have been developed for the packaging of raw, ready to bake, preleavened biscuit dough cakes. In such containers, the fibre container bodies are torn open lengthwise to expose the container contents to thus make it possible to remove the individual dough cakes without substantial deformation. It is sometimes desirable to include in such packages a quantity of icing or other topping for use in the preparation of the biscuits. It is of course necessary to provide means in the container for keeping the topping separated from the dough cakes so that each can be handled cleanly by the ultimate consumer.

The present invention contemplates the provision of a container which is particularly suited for such use. In the instant container, the topping is packed in a small open ended plastic cup which, after being filled, is inserted, open end first, through an open end of the container body and pushed through the body until it seats against the closed end of the container, the outside diameter of the cup being slightly smaller than the inside diameter of the fibre container body so that the insertion of the cup may be easily effected. The cup preferably is formed of flexible plastic material such as polystyrene and provided with an annular flange adjacent its closed end which is adapted to engage against the interior side wall of the container and form a seal which prevents the dough from extruding into the space between the cup and the main body wall and thus insures that the side wall of the cup remain clean and easy to handle after the container has been opened.

An object of the present invention is the provision of a compartment container which is particularly suited for the packaging of raw biscuit dough and a supply of topping.

Another object is the provision of an easy-to-open compartment container wherein at least two different food products may be packed without becoming intermingled.

Another object is the provision of a compartment container which embodies a separate open-top flexible plastic compartment or cup which is easily insertable into a composite container and which provides a sealed separate compartment which is sealed off from the main container compartment without requiring a special seaming operation.

Numerous other objects and advantages of the invention will be apparent as it is better understood from the following description, which, taken in connection with the accompanying drawings, discloses a preferred embodiment thereof.

Referring to the drawings:
FIGURE 1 is a perspective view of a compartment container embodying the instant invention, a portion of the side wall of the container body being broken away;
FIG. 2 is a perspective view of the plastic cup which is adapted to be inserted into the container body for holding the topping, a bottom portion of the cup being broken away;
FIG. 3 is a vertical sectional view of the upper portion of the container shown in FIG. 1 drawn to an enlarged scale; and
FIG. 4 is a vertical section taken through a modified form of plastic cup member.

As a preferred or exemplary embodiment of the instant invention, the drawings illustrate a composite container 11 which comprises a cylindrical fibre body 12 having sheet metal top and bottom end members 13, 14 secured to the opposite ends thereof in end seam joints 15.

The fibre body 12 preferably is of a type which can be torn open in a longitudinal direction, substantially from its top to its bottom. One suitable type of body is that disclosed in the United States Letters Patent No. 2,814,428, issued November 26, 1957, to Donald G. Magill on a Container With Improved Pull Tab Side Seam. Such a body is made from a flat blank which is bent into cylindrical shape and has its opposite marginal side edges secured together by a suitable adhesive in a lap side seam 16. The overlap edge of the body extends beyond the side seam 16 to form a pull tab 17 which, when pulled, effects a breaking open of the side seam 16 and a circumferential tearing of the body along a pair of score lines 18 to fully open the container and expose its contents.

The body 12 may also be of the type shown in United States Letters Patent No. 3,021,047, issued to Ralph K. Pottle on February 13, 1962, for Container. Such a body is opened by means of a tear string which creates a helical line of tear in the body wall. This type of body is not shown in the instant drawing.

The inner surface of the container body 12 preferably is protected by a moistureproof, waterproof and greaseproof material or liner 19 such as aluminum foil. The outer surface of the body 12 also is protected against the penetration of moisture by an outer aluminum foil layer or label 20.

The container body 12 is designed to contain a number of raw biscuit dough cakes 21 which are cylindrical in shape, as best seen in FIG. 1.

The container 11 also includes as a component a small cup 22 (FIG. 2) which is designed to contain a topping 23, such as icing, jelly, etc. which is to be used as a spread for the baked biscuits. The cup 22 preferably is made from a resilient flexible plastic material such as polystyrene, polypropylene, polyethylene, or the like, and comprises a tubular, cylindrical body wall 24 which is closed at one end by an imperforate bottom wall 25. The cup 22 preferably is formed for free and easy insertion into the container body 12 and for this purpose has an external dimension which is slightly less than the internal dimension of the container body 12 so that there is a slight space 26 between the cup and the body.

The cup 22 preferably is filled with the topping 23 and inserted into the container body 12, prior to the time the biscuit cakes 21 are filled into it and prior to the time the bottom end 14 is seamed on, in such manner that the edge of the open end of the filled cup 22 engages against the inner surface of the top end member 13. With the cup 22 arranged in this position, its open end edge is pressed against the top end member 13 in a relatively tight seal by the internal pressure which is usually developed by the leavening agent which is present in the biscuit dough cakes 21 which are subsequently packed into the balance of the body 12, which is then closed by the application of the bottom end 14.

In order to prevent the biscuit dough from extruding into the space 26 and soiling the outside of the cup 22, the cup 22 is formed with an integral resilient annular flange or sealing gasket 27 which preferably is located adjacent its bottom wall 25.

Prior to its insertion into the container body 12, the flexible gasket 27 flares outwardly at an obtuse angle to the body wall 24 of the cup 22 and terminates in a thin feather edge 28. The gasket 27 is initially somewhat larger in diameter than the internal diameter of the body 12. Thus, when the cup 22 is inserted into the body 12, the gasket 27 is wiped against the internal wall surface of the body 12 and is flexed inwardly by it, thus forming a tight seal therebetween (FIG. 3) so that passage of the dough 21 past the gasket 27 is effectively prevented. In addition, the gasket 27 functions to center the cup 22 relative to the body 12.

Because of the thinness and inherent flexibility of the gasket 27, it bends inwardly very easily when the cup is inserted into the body 12 and neither tears nor deforms the liner 19 of the body.

After the container has been filled with the dough cakes 21 and sealed, the pressure generated by the leavening in the dough causes the cakes 21 to press tightly against the bottom wall 25 of the cup 22, thus increasing the effectiveness of the seal which the open end of the cup 22 makes against the top closure member 13. If desired, the effectiveness of this seal may be increased by providing a small flared flange 30 at the open end of the cup 22 which will flex under this increased pressure. Such a modification is shown in FIG. 4. In all other respects, the cup 22 of FIG. 4 is identical to that of FIGS. 1–3.

The container 11 may be easily opened by pulling on the pull tab 17 to thereby expose for easy removal both the dough 21 and the cup 22. Thereafter, the topping 23 is removed from the cup 22, and spread on the biscuit cakes 21, either before or after they are baked, according to its nature.

It will be realized, of course, that the container 11 may be used for the packaging of products other than biscuit dough and topping. Also, that it is not necessary that the body 12 be fibre, nor that it be capable of being torn open longitudinally, since under some circumstances it will be desired to open the body 12 by removing the top end 13 and pulling the cup 22 out through the opened end of the body.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A compartmented container, comprising a tubular container body, an end closure member secured to one end of said container body, a resilient plastic cup having a tubular side wall, an open end and a closed end, said cup being located within said container body adjacent one end thereof with the open end of said cup disposed in engagement with said end closure member for providing a separate compartment within said container body, and a flexible flared annular flange formed integral with said cup and extending outwardly from the side wall of said cup adjacent its closed end and away from the open end of said cup and engageable against the interior wall surface of said container body for providing a seal between said cup and said container body.

2. The container of claim 1 wherein the external diameter of the side wall of said plastic cup is smaller than the internal diameter of said container body and wherein said annular flange which extends outwardly from the side wall of said cup terminates at its outer periphery in a flexible thin feather edge.

3. The container of claim 2 wherein said annular flange flares angularly from the side wall of said cup and has an initial diameter greater than the internal diameter of the container body.

4. The container of claim 3, wherein an outwardly extending annular flared flange is formed at the edge of the open end of the plastic cup.

5. The container of claim 3 wherein said plastic cup contains an edible topping, and wherein said container beyond said cup contains unbaked dough.

6. The container of claim 3 wherein said body is provided with opening means which extend longitudinally thereof.

References Cited by the Examiner

UNITED STATES PATENTS

| 2,626,847 | 1/53 | Brown. |
| 2,855,884 | 10/58 | Magill. |
| 2,949,369 | 8/60 | Zoeller et al. _____ 206—47 X |
| 3,015,429 | 1/62 | Morici. |
| 3,021,047 | 2/62 | Pottle et al. |
| 3,070,224 | 12/62 | Robinson et al. |

FRANKLIN T. GARRETT, *Primary Examiner.*

EARLE J. DRUMMOND, *Examiner.*